United States Patent
Rothman et al.

(10) Patent No.: US 7,263,605 B2
(45) Date of Patent: Aug. 28, 2007

(54) DECOUPLED HARDWARE CONFIGURATION MANAGER THAT GENERATES A USER INTERFACE PRIOR TO BOOTING USING HARDWARE CONFIGURATION OPTION DATA READ FROM PLURALITY OF HARDWARE DEVICES

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 10/315,803

(22) Filed: Dec. 9, 2002

(65) Prior Publication Data

US 2004/0109017 A1 Jun. 10, 2004

(51) Int. Cl.
G06F 9/00 (2006.01)
(52) U.S. Cl. ............................. 713/2; 710/10; 715/700
(58) Field of Classification Search ................. 713/2; 710/10; 715/700
See application file for complete search history.

(56) References Cited

U.S. PATENT DOCUMENTS

| | | | |
|---|---|---|---|
| 5,740,436 A * | 4/1998 | Davis et al. .................. 713/1 |
| 6,801,507 B1 * | 10/2004 | Humpleman et al. ....... 370/257 |
| 6,961,791 B2 * | 11/2005 | Cepulis ....................... 710/104 |
| 2002/0174209 A1 * | 11/2002 | Sesek et al. ................. 709/223 |
| 2003/0120909 A1 | 6/2003 | Zimmer et al. |
| 2003/0204714 A1 | 10/2003 | Rothman et al. |
| 2003/0236971 A1 | 12/2003 | Rothman et al. |
| 2004/0088531 A1 | 5/2004 | Rothman et al. |
| 2004/0123093 A1 | 6/2004 | Rothman et al. |
| 2004/0158840 A1 | 8/2004 | Rothman et al. |
| 2004/0193738 A1 | 9/2004 | Natu et al. |
| 2004/0193860 A1 | 9/2004 | Rothman et al. |
| 2004/0236567 A1 | 11/2004 | Rothman et al. |
| 2004/0236934 A1 | 11/2004 | Rothman et al. |
| 2004/0252122 A1 | 12/2004 | Rothman et al. |
| 2004/0267708 A1 | 12/2004 | Rothman et al. |
| 2004/0267764 A1 | 12/2004 | Rothman et al. |
| 2004/0268107 A1 | 12/2004 | Rothman et al. |
| 2005/0160159 A1 | 7/2005 | Zimmer et al. |
| 2005/0177710 A1 | 8/2005 | Rothman et al. |

FOREIGN PATENT DOCUMENTS

WO    WO 01/88704 A    11/2001

OTHER PUBLICATIONS

Intel, "Extensible Firmware Interface Specification", Chapters 17: Boot Manager & 18: PCI Expansion Rom, Version 1.02, Dec. 12, 2000.*
Wim Bervoets: Standard CMOS Setup. Feb. 12, 2000, XP002345413. Retrieved from the Internet: www.wimsbios.com/HTML1/standard.html.
Lennart Augustsson: Manual Reference Pages—USB(4). 'Online! Feb. 21, 1999, XP002345414 Retrieved from the Internet: www.gsp.com/cig-bin/man.cgi?section=4&topic=usb.
PCT ISR WO 11-10-05.
"Device Configuration Assistant Design Overview", Specification, Vers. 1.0a, SUN Legal Terms, 8 pgs. & Bibliography, (1994).
Compaq, Phoenix, Intel: "BIOS Boot Specification", Version 1.01, pp. 1-46, (1996).
Wade, R., et al., *Intel DevelopperUPDATEMagazine*, "The PC-AT Boot Process and Option ROMs", pp. 1-11, (1999).

* cited by examiner

*Primary Examiner*—Chun Cao
*Assistant Examiner*—Albert Wang
(74) *Attorney, Agent, or Firm*—Schwabe, Williamson & Wyatt, P.C.

(57) ABSTRACT

The present disclosure relates to a technique or device to allow hardware related drivers to present a centralized configuration program and, more particularly, to a technique or device to allow hardware related drivers to present configuration information to a centralized user interface manager.

30 Claims, 3 Drawing Sheets

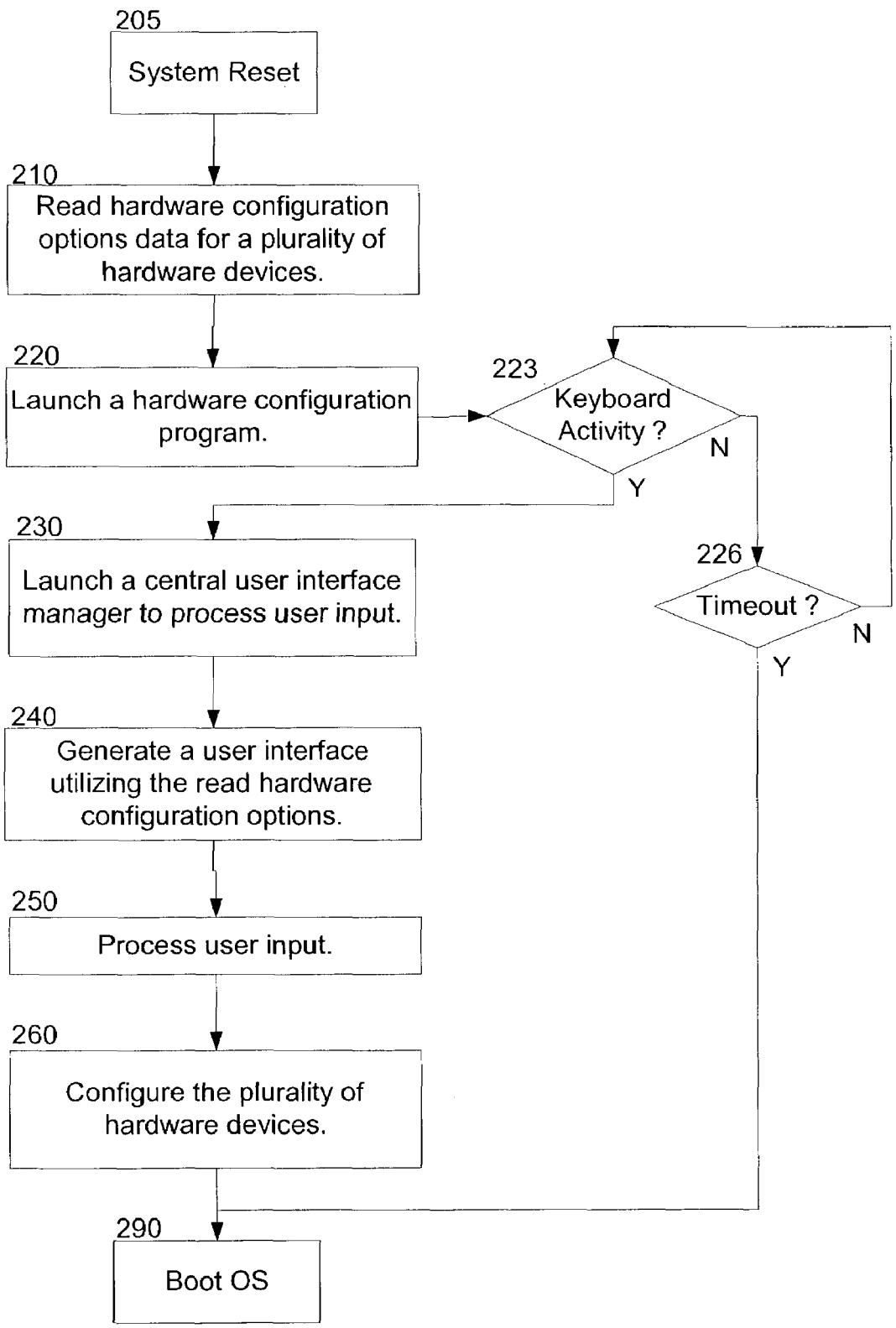

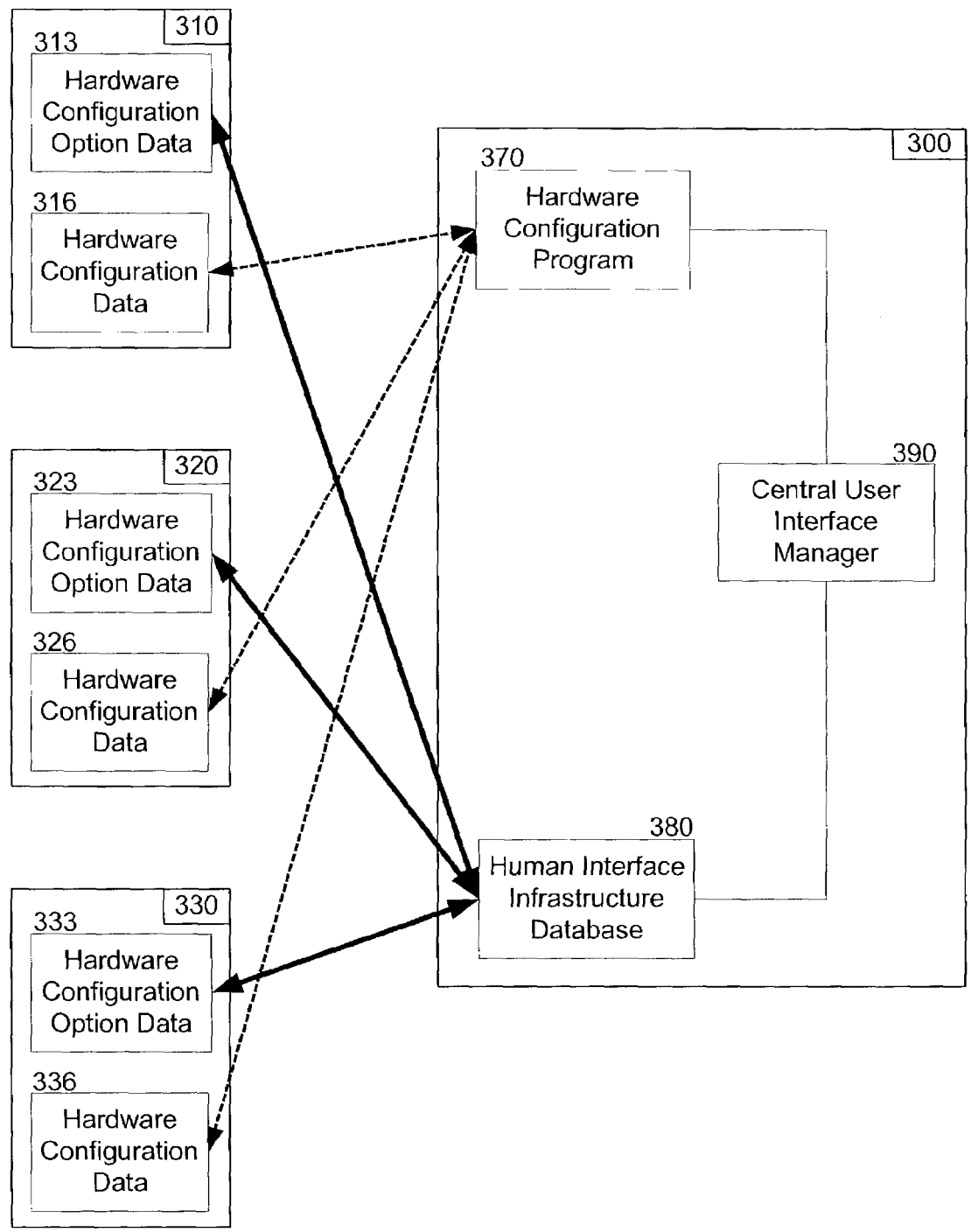

DECOUPLED HARDWARE CONFIGURATION MANAGER THAT GENERATES A USER INTERFACE PRIOR TO BOOTING USING HARDWARE CONFIGURATION OPTION DATA READ FROM PLURALITY OF HARDWARE DEVICES

BACKGROUND

1. Field

The present disclosure relates to a technique or device to allow hardware related drivers to present a centralized configuration program and, more particularly, to a technique or device to allow hardware related drivers to present configuration information to a centralized user interface manager.

2. Background Information

Typically, the operation of a computer or processing system (hereafter, "computer") may be divided into two stages, pre-boot and runtime. The pre-boot process or phase often comprises starting or resetting a computer. When first turned on (cold boot) or reset/reboot (warm boot), a computer executes the firmware that loads and starts the computer's more complicated operating system and prepares it for use. Thus, the computer can be said to pull itself up by its own bootstraps. The runtime process or phase often occurs after the pre-boot phase and includes the execution of an operating system and other user applications. The runtime phase is typically the phase that users interact with the computer. Typically the runtime phase is where the operating system (OS) has taken primary control of the system and, for the most part, the system firmware has released control of the system. Thus, the computer can be said to being running application programs.

Typically, during pre-boot, the computer is first powered on and has very limited capabilities because the volatile memory contains random data and no operating system is running. To begin the pre-boot phase, the processor is often reset to a known state and instructions found at a pre-defined location are executed. Traditionally, this pre-defined location is mapped to a non-volatile memory or firmware referred to as a Basic Input/Output System (BIOS). The BIOS often includes several low-level procedures to control the initialization of the hardware components that comprise the computer. Traditionally, each hardware component is associated with an individual driver that may have allowed the hardware device to be configured during the pre-boot phase.

FIG. 1 is a flowchart illustrating an embodiment of the traditional pre-boot phase. After a system reset 105, various hardware drivers 110, 120, & 130 may be executed. Normally, each driver that allows for user configuration is required to provide its own keystroke polling mechanism to detect the selection of a hot key. In this context, a hot key is a keystroke, such as, for example, "F2," that launches or provides access to a hardware configuration program. Block 112 illustrates that each driver has to provide an individual mechanism to poll the keyboard. Block 114 illustrates that if any key is pressed, the driver has to determine if the proper hotkey was selected, blocks 116 & 117. If not, the driver continues to poll the keyboard until a timer expires, block 119. If the hotkey was pressed, the driver has to provide its own configuration options, user interface and program to store any selected setting, block 118. Each driver is usually required to perform some combination of blocks 112 through 119 before the operating system was allowed to boot, block 190.

This solution is less than optimal because drivers currently do not share code and a separate polling mechanism and configuration program is typically written, tested, and distributed for each driver. This consumes memory storage on the system and engineering resources. For example, an add-in card must carry a non-volatile memory, such as, for example, a flash memory, to accommodate the add-in card's own driver resources. Furthermore, the drivers are difficult to localize for international use, because the user interface programs must be recompiled and tested for each locale. In addition, the solution is less then optimal for the user, who must remember a number of hotkeys and which drivers the hotkeys are associated. Furthermore, each driver provides its own configuration program and user interface. This increases the potential for user confusion and frustration.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

FIG. 2 is a flowchart illustrating an embodiment of a technique for allowing hardware related drivers to present configuration information to a centralized configuration program in accordance with the disclosed subject matter; and FIG. 3 is a block diagram illustrating an embodiment of a system that allows hardware related drivers to present configuration information to a centralized configuration program in accordance with the disclosed subject matter.

DETAILED DESCRIPTION

Figure 1:
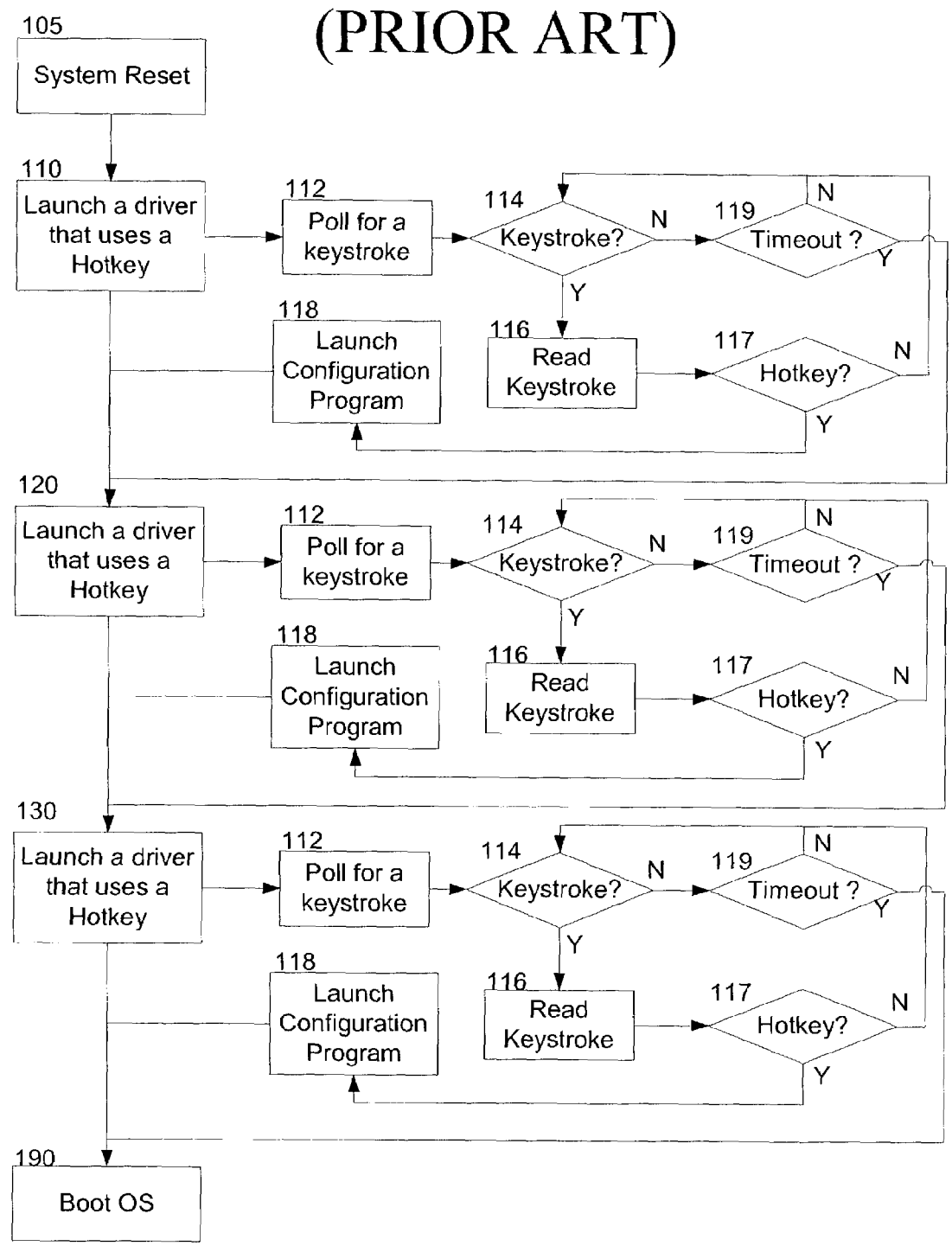
FIG. 1 is a flowchart illustrating an embodiment of the prior art.

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

FIG. 2 is a flowchart illustrating an embodiment of a technique for allowing hardware related drivers to present configuration information to a centralized configuration program in accordance with the disclosed subject matter. In one embodiment, the technique may include block 205 that illustrates the system may be reset and block 290 that illustrates the booting of the operating system. In short, it is contemplated that one embodiment of the disclosed subject matter may occur during the pre-boot phase. However, the disclosed subject matter is not limited to the pre-boot phase and performing the technique, in whole or part, during the runtime phase is contemplated.

Block 210 illustrates that the hardware configuration option data may be read from a plurality of hardware devices. It is contemplated that each hardware device may provide their configuration options in a data file. It is further contemplated that the hardware devices may export their configuration option data or that, alternatively, the configuration option data may be accessed from the hardware devices. It is also contemplated that a system may include hardware devices that have no configuration option data, or, possibly, only one possible configuration.

In one specific embodiment, the hardware configuration option data may include data in an Internal Form Representation (IFR) format. This data may be formatted to include a series of configuration sets. Each configuration set may include an encoded opcode that contains the description of the type of setting and a series of tokenizing strings to enable the creation of human readable questions and possible answers relating to the hardware setting. For example, one embodiment of a configuration set may involve the amount of memory allocated for a video buffer. The configuration set may include an opcode denoting that the configuration has 3 possible options, a question string, such as, "Buffer Size," three option strings, such as, "32 MB," "64 MB," and "128 MB," and a default value representing the "64 MB" option. Of course, this is merely one specific embodiment of the disclosed subject matter and other hardware configuration option data and values are contemplated. It is also contemplated that the hardware configuration option data may include a series of sub-sets of string values. Each sub-set may correspond to a different human language, such as, for example, U.S. English, U.K. English, French, or Chinese. It is contemplated that these various sub-sets may be selected based upon a user defined or pre-defined global or local setting.

It is contemplated that the hardware configuration option data may be read from a plurality of hardware devices into a human interface infrastructure database (HIID). It is contemplated that the HIID may provide a central repository for all the hardware configuration options and, in one embodiment, the current hardware configuration settings. It is contemplated that the HIID and the IFR may be stored in a variety of formats, such as, but not limited to, extensible markup language (XML), hypertext markup language (HTML), compressed binary data, encrypted binary, or another format.

It is contemplated that, in one embodiment of the disclosed subject matter, the HIID may be accessed by a runtime application, such as, for example, a web browser utilizing a network interface. However, it is contemplated that other applications may also access the HIID. It is contemplated that, in one specific embodiment, the HIID may be substantially compliant with the tables and databases defined in the Extensible Firmware Interface (EFI) specification. *Extensible Firmware Interface (EFI) Specification*, ver 1.02, Dec. 12, 2000, Intel Corp. (hereafter, "the EFI specification"). However, this is merely one specific embodiment of the disclosed subject matter.

Block 220 illustrates that a hardware configuration program may be launched. In one embodiment, the hardware configuration program may display a splash screen, possibly informing a user that the hardware configuration program is running and that the hardware may be configured. In another embodiment, the hardware configuration program may poll an input device and only enter the configuration portion of the program if a certain activity occurs. As illustrated by blocks 223 & 226, it is contemplated that this may be similar to the polling mechanism described in regards to FIG. 1. A noticeable difference is that in FIG. 1, each driver was required to poll and wait for an individual hotkey. In this one embodiment, the hotkey mechanism is centralized, as opposed to decentralized and duplicated, and the user need only press one key to access the configuration option for every hardware device, as opposed to a separate hotkey for each device. It is contemplated that any input activity may be monitored, such as, for example, a network command.

Block 230 illustrates that a central user interface manager may be launched. This central user interface manager may process all user input during the pre-boot phase. It is contemplated that the primary purpose of the central user interface manager may be, in one embodiment, to display a hardware configuration screen related to each hardware device, to allow the user to alter the hardware configuration settings utilizing the screen, and to facilitate the configuration of the hardware devices based, at least in part, upon the selected settings. It is contemplated that other user interface techniques, such as for example, tabs, may be utilized besides or in addition to screens.

It is also contemplated that the central user interface manager may be, in one embodiment, part of the hardware configuration program. Likewise, in various embodiments, the central user interface may also generate the user interface, manage user input, record the selected hardware settings, and provide the hardware devices with the selected settings. It is contemplated that the central user interface manager may receive input from an input device directly coupled to the system, from a network interface, or a variety of other sources. It is also contemplated that the central user interface manger may operate in either the pre-boot or runtime phases.

In one embodiment, the central user interface may generate an initial user interface and selection screen. In this embodiment, the selection screen may allow a user to perform actions, such as, for example, exit the program, set the default language or locale, save the selected settings, select which hardware device to configure, or perform other actions. It is contemplated that the options of the selection screen may themselves be controlled by a set of hardware configuration option data, or, alternatively, be pre-configured or determined dynamically.

Block 240 illustrates that a user interface for the hardware configuration of each hardware device may be generated, utilizing the hardware configuration option data from the HIID. Using the option data, it is contemplated that a user interface comprising a series of questions and possible answers may be generated. Of course, it is contemplated that other user interface formats are possible and that this is merely one example. In one embodiment, only one settings screen or the user interface for one hardware device may be displayed at a time. In other embodiments, multiple hardware device setting user interfaces may be displayed simultaneously or selectively. It is contemplated that each hardware device user interface may be roughly analogous to the configuration programs illustrated in FIG. 1; however, the configuration of the hardware devices is managed in a central location, by a central program, in the embodiment of FIG. 2 versus the decentralized process of FIG. 1.

In one embodiment, a common "look-and-feel" may be generated across all user interfaces dealing with the hardware devices. It is contemplated that the "look-and-feel" may be user selectable. It is also contemplated that, in one embodiment, the hardware device may be able to select a "look-and-feel" via the options data.

Block 250 illustrates that the user input may be processed and the hardware devices may be configured with the selected settings. It is contemplated that default settings may be selected for a hardware device, if the user did not change the configuration of a hardware device. It is also contemplated that the user may select from a set of pre-configured settings. In one embodiment, a hardware device that controls network access may provide a host of individual settings and a set of pre-configured settings (such as, for example, "low security," "high security") that change the default values of the individual settings.

Block 260 illustrates that the hardware devices may be configured with the selected settings. It is contemplated that these settings may be written directly to the hardware devices, to a hardware configuration data file or section of memory within the hardware device, to a central database, to a variety of other locales. It is also contemplated that the new settings may take effect immediately, during a portion of the pre-boot phase, or during the next reset of the system.

FIG. 3 is a block diagram illustrating an embodiment of a system that allows hardware related drivers to present configuration information to a centralized configuration program in accordance with the disclosed subject matter. It is contemplated that an embodiment of such a system may take many forms, such as for example, everything from small handheld electronic devices, such as personal data assistants and cellular phones, to application-specific electronic devices, such as set-top boxes, digital cameras, and other consumer electronics, to medium sized mobile systems such as notebook sub-notebook, and tablet computers, to desktop systems, workstations, and servers. However, the system is not limited to the forms described above and other forms are contemplated.

An embodiment of a system in accordance with the disclosed subject matter may include a plurality of hardware devices 310, 320 & 330, and a configuration system 300 that includes a central user interface manager 390, a human interface infrastructure database 380 and a hardware configuration program 370. In one embodiment, these components may function and be arranged in accordance with the blocks described in FIG. 2.

In one embodiment, human interface infrastructure database 380 may be capable of reading the hardware configuration option data 313, 323 & 333 stored in hardware devices 310, 320 & 330, respectively. It is contemplated that each hardware device may contain unique hardware configuration option data. It is also contemplated that in other embodiments that data may not be stored within the hardware devices but obtained from other sources.

Hardware configuration program 370 may function as described above in relation to block 220 of FIG. 2. In addition, the hardware configuration program may launch the central user interface manager 390 of FIG. 3 and configure the plurality of hardware devices 310, 320 & 330 by, in one embodiment, writing the selected setting to hardware configuration data 316, 326, & 336, respectively.

Central user interface manager 390 of FIG. 3, may, in one embodiment, generate a user interface utilizing the hardware configuration option data and process the user input, as described above.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, flash memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. A method comprising:
prior to booting an operating system, reading hardware configuration option data from a plurality of hardware devices coupled to a host, using a hardware configuration program of the host, wherein the plurality of hardware devices are part of a single non-distributed hardware system, said hardware configuration option data is in a standardized format and comprises a series of configuration sets wherein each configuration set facilitates the configuration of at least one hardware setting of at least one of the plurality of hardware devices and includes:
an encoded opcode to specify what type of hardware setting is to be configured; and
a series of tokenizing strings to facilitate creation of a human readable question and answer related to the hardware setting;
upon said reading, generating a user interface utilizing the hardware configuration option data to solicit user input data, using a central user interface manager of the host;
on receiving the solicted user input data, processing the user input data, and configuring at least one of the hardware devices in accordance with the user input data, using the hardware configuration program; and
after said configuring, booting the operating system.

2. The method of claim 1, further including:
prior to said reading, resetting the hardware system.

3. The method of claim 1, wherein reading hardware configuration option data further comprises:
storing the hardware configuration option data into a human interface infrastructure database.

4. The method of claim 3, wherein the standardized format of the hardware configuration option data is an internal form representation format.

5. The method of claim 4, wherein the human interface infrastructure database is substantially compliant with an extensible firmware interface specification.

6. The method of claim 4, wherein configuring the at least one hardware devices in accordance with the user input includes:
   writing a modified version of the hardware configuration option data to the plurality of devices;
   wherein the modified version of the hardware configuration option data includes a value representing the user selected setting.

7. The method of claim 1, wherein the series of tokenizing strings provides a plurality of sub-series of tokenizing strings, each sub-series relating to a different human language.

8. The method of claim 1, wherein the hardware configuration option data is stored in at least one of the following formats:
   an extensible markup language (XML) format;
   a hypertext markup language (HTML) format;
   a compressed binary format; and
   an encrypted binary format.

9. The method of claim 1, further comprising:
   polling an input device to determine if an input activity occurred;
   wherein if an input activity occurred processing user input data inputted through the occurred input activity.

10. The method of claim 9, wherein said processing user input data includes:
    displaying a splash screen that informs a user of the processing.

11. The method of claim 9, wherein said processing the user input data includes:
    receiving user input data selecting hardware settings;
    recording the selected hardware settings; and
    providing the selected hardware settings to the hardware devices.

12. The method of claim 11, wherein the generating a user interface utilizing the hardware configuration option data includes:
    generating, for each one of the plurality of hardware devices, a device-specific configuration screen, or set of device-specific configuration screens, to configure the settings for each hardware device; and
    displaying the user interface;
    wherein
      each device-specific configuration screen, or set of device-specific configuration screens, has a similar appearance; and
      the hardware configuration option data for each hardware device is used to populate the hardware device's device-specific configuration screen or set of device-specific configuration screens with a series of questions and possible answers.

13. The method of claim 12, wherein the generating of a user interface includes at least one of the following:
    selecting which human language will be displayed by the user interface; and
    selecting which hardware device's configuration data will be displayed at a given time.

14. The method of claim 13, wherein generating a user interface includes selectively determining which device-specific configuration screen, or set of device-specific configuration screens, will be displayed.

15. The method of claim 12, wherein the generating of a user interface to configure the settings for each hardware device includes:
    displaying only one device-specific configuration screen at a time.

16. The method of claim 1, wherein processing user input data includes at least one of the following:
    processing user input data received during the pre-boot phase; and
    processing user input data received during the runtime phase, but configuring the plurality of hardware devices during a subsequent pre-boot phase.

17. A system comprising:
    a plurality of hardware devices each having:
      hardware configuration option data to denote hardware settings that may be selected, and hardware configuration data to represent hardware settings that are currently selected, said hardware configuration option data including a series of configuration sets wherein each configuration set facilitates the configuration of at least one hardware setting of at least one of the hardware devices and includes:
        an encoded opcode to specify what type of hardware setting is to be configured; and
        a series of tokenizing strings to facilitate creation of a human readable question and answer related to the hardware setting;
    a human interface infrastructure database to store the hardware configuration option data of the plurality of hardware devices retrieved from the hardware devices;
    a central user interface manager coupled to the human interface infrastructure database and the hardware devices to provide a single user interface using the configuration option data to solicit user input data, prior to booting an operating system, to facilitate configuring the plurality of hardware devices; and
    a hardware configuration program coupled to the central user interface manager to configure the hardware settings of the plurality of hardware devices using at least the solicited user input data.

18. The system of claim 17, wherein:
    the central user interface manager is capable of utilizing the human interface infrastructure database to generate the user interface.

19. The system of claim 18, wherein the hardware configuration option data includes
    a standardized internal form representation format and;
    the central user interface manager is capable of utilizing the human interface infrastructure database to generate the user interface.

20. The system of claim 18, wherein the central user interface manager is capable of polling an input device to determine if an input activity occurred; and
    if an input activity occurred, generating the user interface to facilitate the configuration of each hardware device.

21. The system of claim 20, wherein the central user interface manager is capable of utilizing the hardware configuration options data to populate the user interface with a series of questions and possible answers.

22. The system of claim 17, wherein the central user interface manager is capable of sending a user selected setting to the hardware configuration program; and
    the hardware configuration program is capable of writing hardware configuration data to the plurality of hardware devices utilizing the user selected settings.

23. The system of claim 17, wherein the central user interface manager is capable of processing user input data
    received during a pre-boot phase prior to booting an operating system; and
    received during a runtime phase after booting an operating system.

24. The system of claim 17, wherein the central user interface manager and the hardware configuration program are only capable of operating during a pre-boot phase prior to booting an operating system.

25. The system of claim 17, wherein the human interface infrastructure database is capable of operating in both a pre-boot phase prior to booting an operating system and a runtime phase after booting an operating system; and is further capable of exporting the hardware configuration option data into the human interface infrastructure database in at least one of the following formats:
an extensible markup language (XML) format;
a hypertext markup language (HTML) format;
a compressed binary format; and
an encrypted binary format.

26. An article comprising:
a plurality of machine accessible instructions stored on a storage medium, said plurality of machine accessible instructions executed to program an apparatus, prior to booting an operating system, to:
read hardware configuration option data from a plurality of hardware devices coupled to a host, using a hardware configuration program of the host, wherein the plurality of hardware devices are part of a single non-distributed hardware system, said hardware configuration option data including a series of configuration sets each facilitating the configuration of at least one hardware setting and including:
an encoded opcode to specify what type of hardware setting is to be configured; and
a series of tokenizing strings to facilitate creation of a human readable question and answer related to the hardware setting; and
upon said reading, generate a user interface utilizing the hardware configuration option data to solicit user input data, using a central user interface manager of the host;
upon receiving the solicited user input data, process the user input data; and
configure at least one of the hardware devices in accordance with the user input data using the hardware configuration program.

27. The article of claim 26, wherein the plurality of machine accessible instructions are further designed to:
reset a hardware system; and
after said configuration, boot an operating system.

28. The article of claim 26, wherein the plurality of machine accessible instructions designed to read hardware configuration option data further comprises instructions to:
receive hardware configuration option data from a plurality of devices, wherein the hardware configuration option data is in a standardized format; and
export the hardware configuration option data into a human interface infrastructure database.

29. The article of claim 28, wherein the standardized format of the hardware configuration option data is an internal form representation format having a series of configuration sets.

30. The article of claim 29, wherein the series of tokenizing strings comprises a plurality of sub-series of tokenizing strings, each sub-series relating to a different human language.

* * * * *